United States Patent
Dureau (10) Patent No.: US 6,721,958 B1
(45) Date of Patent: Apr. 13, 2004

(54) OPTIONAL VERIFICATION OF INTERACTIVE TELEVISION CONTENT

(75) Inventor: Vincent Dureau, Palo Alto, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

(21) Appl. No.: 09/521,251

(22) Filed: Mar. 8, 2000

(51) Int. Cl.⁷ ................................. H04N 7/16
(52) U.S. Cl. .................... 725/136; 725/25; 380/211; 713/160
(58) Field of Search ............. 725/136, 25, 31, 725/135, 109, 110; 380/33, 211, 201; 713/160, 182, 201, 200, 153, 161; 705/57

(56) References Cited

U.S. PATENT DOCUMENTS

| | | | |
|---|---|---|---|
| 5,625,693 A | * 4/1997 | Rohatgi et al. | 380/212 |
| 5,892,904 A | * 4/1999 | Atkinson et al. | 713/201 |
| 6,038,319 A | 3/2000 | Chari | |
| 6,069,647 A | * 5/2000 | Sullivan et al. | 725/29 |
| 6,125,447 A | * 9/2000 | Gong | 713/201 |
| 6,148,081 A | * 11/2000 | Szymanski et al. | 380/33 |
| 6,157,719 A | * 12/2000 | Wasilewski et al. | 725/31 |
| 6,427,238 B1 | * 7/2002 | Goodman et al. | 725/136 |
| 6,460,180 B1 | * 10/2002 | Park et al. | 725/135 |
| 6,476,833 B1 | * 11/2002 | Moshfeghi | 345/854 |

FOREIGN PATENT DOCUMENTS

| | | |
|---|---|---|
| EP | 0 752 786 | 1/1997 |
| WO | WO 9962248 A1 * 12/1999 | H04N/5/00 |

OTHER PUBLICATIONS

Crichton et al., "When to trust mobile objects: access control in the Jini ™Software System," Aug. 1999, pp. 116–125.
International Search Report, application No. PCT/US 01/07621, mailed Nov. 26, 2001.

* cited by examiner

Primary Examiner—John Miller
Assistant Examiner—Scott Beliveau
(74) Attorney, Agent, or Firm—Meyertons Hood Kivlin Kowert & Goetzel, P.C.; Rory D. Rankin (57) ABSTRACT

A system and method implemented in an interactive television system for selectively controlling the verification of interactive television content delivered to a receiver wherein a notification is provided to the receiver to identify content which can be trusted and, when trusted content is delivered to the receiver, verification procedures on the trusted content are inhibited. The notification may be delivered prior to or with the trusted content, and it may be delivered via the same transmission means as the content or by some separate delivery means. The notification may identify the trusted content positively or negatively and may use wildcards in the identification. The trusted content may be identified by its source (e.g., a trusted channel) or by reference to the content itself. The notification may contain an expiration time beyond which is no longer valid. The notification may also contain an identifier and version number so that a subsequent notification having the same identifier and a later version number will supersede the prior notification.

44 Claims, 4 Drawing Sheets

OPTIONAL VERIFICATION OF INTERACTIVE TELEVISION CONTENT

BACKGROUND OF THE INVENTION

1. Field of the Invention

The invention relates to interactive television systems and more particularly to a system and method for selectively inhibiting verification of interactive television content which can be trusted while verifying content which is not trusted.

2. Description of Related Art

An interactive television network may implement a variety of measures to maintain the security and quality of transmitted programs. Different networks may not implement the same measures, so the different networks may have different levels of security or quality.

Some networks may have very low levels of security and/or quality. For example, in a horizontal "free to air" television network, many service providers may be allowed to transmit interactive television content directly to a user without network operator control and without any assurance that the content meets the level of quality expected by the manufacturer of the interactive television receiver. As another example, shared media such as the Internet or cable networks may allow third parties to easily modify content which is being transmitted from a sending party to a receiving party. In these networks, content that reaches a receiver cannot be trusted to meet the security and/or quality standards of the receiver, either because a third party may have tampered with it, or because it may not have been initially transmitted with the expected level of quality.

Other networks may have much higher levels of security and/or quality. For example, a network may be completely controlled by a network operator or its partners e.g., a vertical pay TV satellite network.) The content transmitted over this network can be verified before it is transmitted so that it will have the level of quality expected by the receiver. Furthermore, it may be extremely costly for a third party to tamper with the content transmitted over this type of network, so it may be assumed that the content has not been modified by a third party. The content that reaches the receiver can therefore be trusted to meet the applicable quality and security standards.

In order to ensure that interactive television content delivered to a receiver meets the appropriate quality and security requirements of that receiver, the content may be verified by the receiver. Verification may ensure that a piece of content was created by a particular producer (i.e., authenticating it,) that the piece of content has not been tampered with during transmission, that the piece of content has appropriate access rights, or that the piece of content complies with a particular specification (e.g., a programming specification.) Verification may entail processing signatures or credentials which accompany a particular piece of content (e.g., in authentication,) comparing data structures to a specification (e.g., in byte code verification against a programming specification,) or other time-and resource-consuming operations.

It may not always be desirable to verify each piece of content. While content in a low security network may need to be authenticated to ensure that it has not been tampered with, content in a high security network may not need to be authenticated because there is little risk that the content has been produced by an unauthorized source, or has been tampered with. Further, if the quality of the content could be ensured prior to transmission, there would be no need to verify the quality of the content at the receiver. In situations in which there is some assurance of quality and/or security, verification of the content would be a waste of time and resources. It would therefore be desirable to provide a system and method for distributing interactive television content which allows verification procedures to be performed on a selective basis.

SUMMARY OF THE INVENTION

The invention comprises a system and method for controlling verification of interactive television content which may include both trusted and non-trusted information. Trusted content may include information received from a trusted source. Trusted content may also include information which, although received from a nontrusted source, is itself identified as trusted information. "Trusted" is used herein to refer to content and/or sources of content for which a receiver has assurance that there is no need to verify the content. For example, there may be assurance that the content is authentic or that the content meets a level of quality expected by the receiver, so that it is not necessary to verify these qualities.

In one embodiment, a method comprises providing a notification to an interactive television receiver to enable the receiver to skip costly verification procedures. Interactive television content which is transmitted to the receiver is identified as trusted or non-trusted content. Portions of the interactive television content which are nontrusted are verified using normal procedures. Portions of the interactive television content which are trusted do not have to be verified, so verification of the trusted content is inhibited.

The identification of the trusted content may be through identification of one or more trusted sources of content, or through identification of particular pieces of content which can be trusted. The trusted content may be identified either positively (e.g., "application A is trusted,") or negatively (e.g., "all applications except application B are trusted.") The authenticity of the notification itself may be ensured by delivery through a trusted means, identification as trusted content, or verification of the notification (e.g., by using a signature.) The notification may include an expiration date after which the notification is no longer valid. The notification may also include an identifier and a version number. When a notification having the same identifier and a later version number than a previous notification is received, the subsequent notification supersedes the previous one.

The notification may be transmitted to the receiver with the trusted content or it may be transmitted prior to transmission of the trusted content. The notification may also be fetched by the receiver when particular content has been received. The notification may be transmitted to the receiver using the same means as the interactive television content, or it may be delivered by different means. If the notification is to be transmitted with the trusted content, it may be included in the system information for the transmission (e.g., descriptors associated with the transmission.) The notification may also be included in signed data for a particular application or module. If the notification is to be transmitted apart from the trusted content, it may, for example, be pushed in a conditional access Entitlement Management Message (EMM,) or it can be transmitted (either pushed or pulled) over a point-to-point connection.

In one embodiment, an interactive television receiver is configured to receive interactive television content. A notification is provided to the receiver. The notification identifies as trusted content some portion of the interactive television content which is delivered to the receiver. The receiver is configured to verify content which is not trusted, but is configured to inhibit verification of trusted content. The receiver thereby avoids re-verification of content which is already trusted. (In another embodiment, the receiver may be configured as a default to not verify any content unless it is identified as non-trusted.)

The receiver is employed in an interactive television system. The receiver is coupled to one or more sources of interactive television content through delivery mechanisms such as a broadcast networks or a point-to-point connections. The sources provide trusted and/or non-trusted content to the receiver. Notifications may be delivered to the receiver through the same delivery mechanisms as the interactive television content itself, or they may be delivered by a separate mechanism. After the content has been verified, or verification of the content has been inhibited, the content is processed by the receiver and output to a television (or remote control or other device) for presentation to a user.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described below. In this embodiment, an interactive television receiver accepts an interactive television signal via one or more media such as cable networks or satellite broadcast networks. The receiver may also accept content from point-to-point connections or other sources of content. The interactive television content transmitted via these media may contain television programs or similar audio-video content, as well as interactive content such as control signals or interactive applications. The interactive television receiver is also configured to receive notifications, either via the media which deliver the interactive television content or through a separate delivery mechanism. These notifications identify one or more pieces of trusted interactive television content which are, or will be, transmitted to the receiver. These pieces of trusted content do not have to be independently verified by the receiver because, as indicated by the notification, the receiver has some assurance that they meet the security and/or quality requirements of the receiver and therefore need not be verified.

Figure 1:
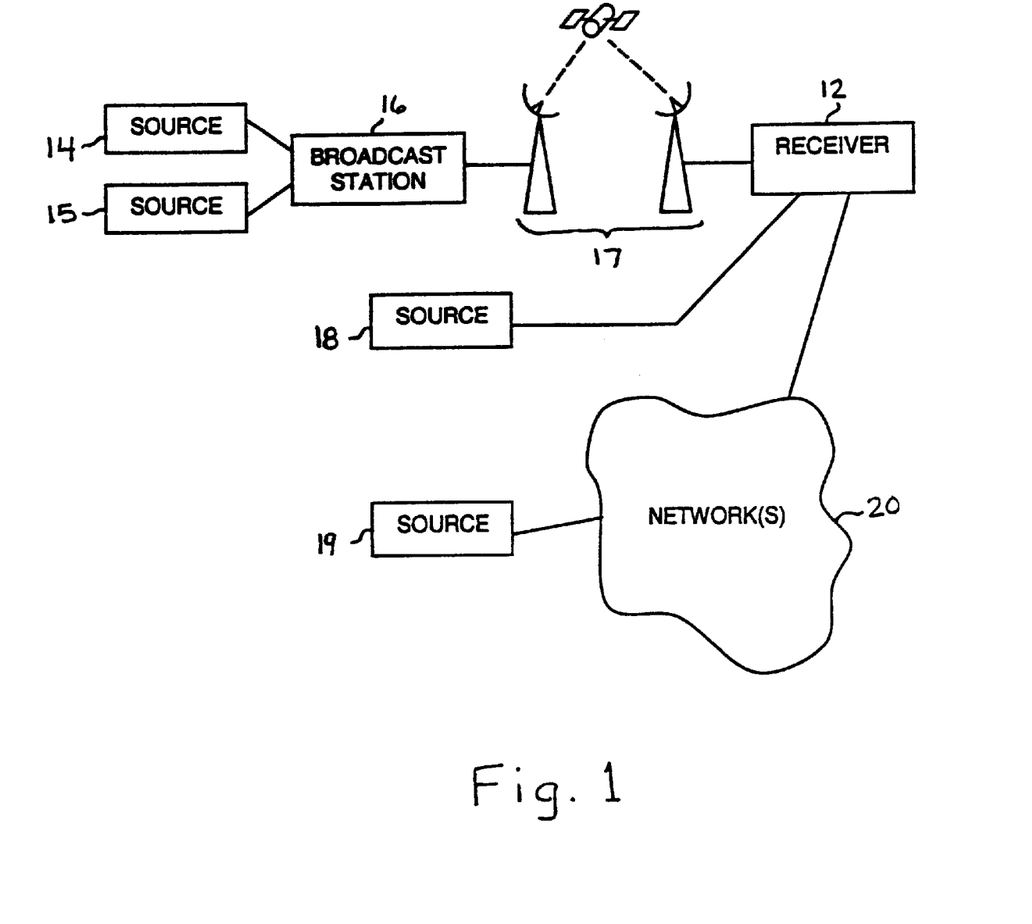
FIG. 1 is a functional block diagram illustrating the distribution of interactive television content from a variety of sources to an interactive television receiver.

Referring to FIG. 1, a functional block diagram illustrating the distribution of interactive television content from a variety of sources to an interactive television receiver is shown. This figure depicts an interactive television receiver 12 which is coupled to several sources of interactive television content. While the content may be delivered through many different delivery mechanisms, three exemplary mechanisms are shown in the figure. First, content from sources 14 and 15 are delivered to receiver 12 through a broadcast transmission network. This network consists essentially of a broadcast station 16 which assembles the content from sources 14 and 15 and processes (e.g., digitizes, compresses and packetizes) the content, and a satellite transmission network 17 which receives the content from broadcast station 16 and transmits it to receiver 12. (It should be noted that receiver 12 may be only one of many receivers to which this content is distributed.) The second delivery mechanism is a direct point-to-point connection between receiver 12 and source of 18, which may be some type of server. This connection may be made via an ordinary telephone line. The third delivery mechanism is also a point-to-point connection, but transmission of the content from source 19 to receiver 12 is made via one or more shared networks (e.g., over the Internet.)

Several different delivery mechanisms shown in FIG. 1 are included in order to illustrate the different levels of security with which interactive television content may be delivered to receiver 12. One delivery mechanism, the direct point-to-point connection to a source of content, may comprise communication via an ordinary telephone line. This type of connection is typically initiated by the receiver to retrieve information from a data server and is normally secure. The content delivered by this mechanism can therefore normally be trusted. Another delivery mechanism, the point-to-point connection through one or more networks, may comprise a typical connection between nodes on the Internet. Because data may be routed through many different shared networks in this case, it may be read, stored and written many times as it is transmitted from source 19 to receiver 12. There are therefore many opportunities for the data to be corrupted, or for a third party to modify the data. Generally speaking, this is therefore a low security delivery mechanism, so interactive television content received via this mechanism normally cannot be trusted.

The third delivery mechanism is a satellite broadcast network. This network may, in one embodiment, comprise a vertical pay TV network. In this type of network, content is typically checked before it is broadcast, and it is difficult in this type of system for a third party to modify content as it is being broadcast, so it can be assumed that content received via this mechanism can be trusted. On the other hand, the satellite broadcast network may comprise a horizontal "free to air" television network. In this type of network, content may not be checked before it is broadcast, and it may be very easy for a third party to modify the content before it reaches the receiver. In this type of low security broadcast network, the content delivered to the receiver cannot be trusted.

Figure 2:
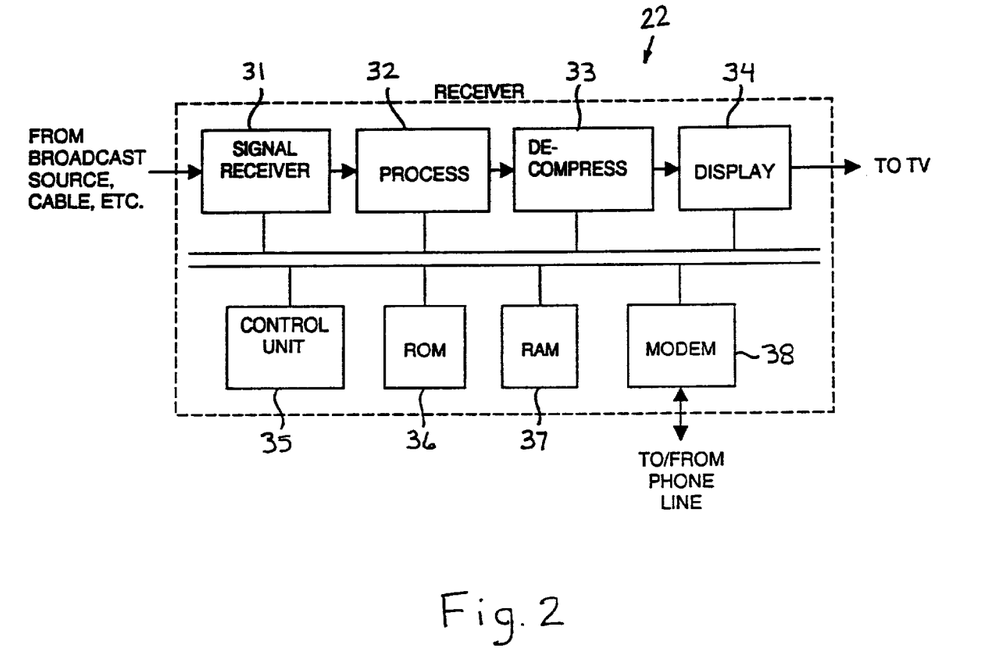
FIG. 2 is a block diagram of an interactive television receiver used in one embodiment.

Referring to FIG. 2, a block diagram of a receiver 22 is shown. Interactive television content is delivered to receiver 22 through a signal receiver such as tuner 31. In this embodiment, a broadcast signal is fed into tuner 31. Tuner 31 selects a channel on which broadcast interactive content is transmitted and passes the content to processing unit 32. (It should be noted that interactive television content may also be delivered to receiver 22 through other signal receivers, such as modem 38.) In the case of a digital satellite transmission, the content is formatted into packets, so processing unit 32 demultiplexes packets from the broadcast signal, and reconstructs the packets into what is typically a compressed television program and/or interactive application embodied in the received content. The decompression is performed by decompression unit 33. The audio and video information associated with television program embodied in the signal is then conveyed to display unit 34, which may perform further processing and conversion of the information into a suitable television format, such as NTSC or HDTV audio/video. Applications reconstructed from the broadcast signal are routed to random access memory (RAM) 37 and are executed by control unit 35.

Control unit 35 may comprise a microprocessor, microcontroller, digital signal processor (DSP), or some other type of software instruction processing device. Memory 36 may include memory units which are static (e.g., SRAM), dynamic (e.g., DRAM), volatile or non-volatile (e.g., FLASH), as required to support the functions of the receiver. System code is typically stored in FLASH memory. When power is applied to the receiver, control unit 35 executes operating system code which is stored in memory 36. The operating system code executes continuously while the receiver is powered in the same manner the operating system code of a typical personal computer (PC) and enables the receiver to execute control information and application code.

Control unit 35 serves as a data verification unit for content delivered to the receiver. Verification of the received content may comprise a number of different procedures. For example, the verification procedures performed by the receiver may include code verification or code file parsing. Code verification comprises checking the compliance of application code against a programming specification prior to execution. This avoids execution-time checking and allows the application code to execute more quickly. Verification procedures may also include authentication. Authentication may comprise decrypting signatures to check the validity of the contents' source or other attributes. Verification may also include checking access rights associated with received content. These rights may, for example, include rights of an application to access physical resources such as modems or hard drives for virtual resources such as stored files or other received content. Still further, verification may include checking the rights of third parties in connection with the received content (e.g., the rights of previously received applications to access the received content.) It should be noted that the procedures listed here are intended to be exemplary of procedures that may be unnecessary for trusted content and may therefore be avoided when trusted content is identified by the system. These procedures may include non-verification procedures as well. For the sake of brevity, however, such procedures will be generally referred to herein as verification procedures.

Control unit 35 is configured to selectively verify received interactive television content based upon notifications which identify particular content as trusted or not trusted. Notifications which are received via the broadcast channel, modem connection or other means are stored in the receiver's memory. As interactive television content is delivered to the receiver, control unit 35 determines whether the content should be verified or not, based upon the notifications' identification of particular content as trusted or non-trusted. In one embodiment, the receiver verifies received content by default. That is, unless a notification identifies particular content as being trusted, it will be verified by the receiver before being used. In other embodiments, the receiver may be configured to assume that all content is trusted, so that no received content will be verified unless it is specifically identified as non-trusted.

The receiver is typically housed in a set-top box connected to a user's television. It should be noted that the receiver may comprise any processing unit for receiving and processing the interactive television content. The receiver may be in a set-top box housing which physically sits on top of a television, it may be in some other location external to the television (e.g., on the side or back of the television or remotely located from the television), or it may be incorporated into the television itself. Similarly, the television to which the output of the receiver is directed may comprise a television or a video monitor employing any suitable television format (e.g., NTSC or HDTV), or it may be replaced by other devices, such as a video recorder.

Figure 3:
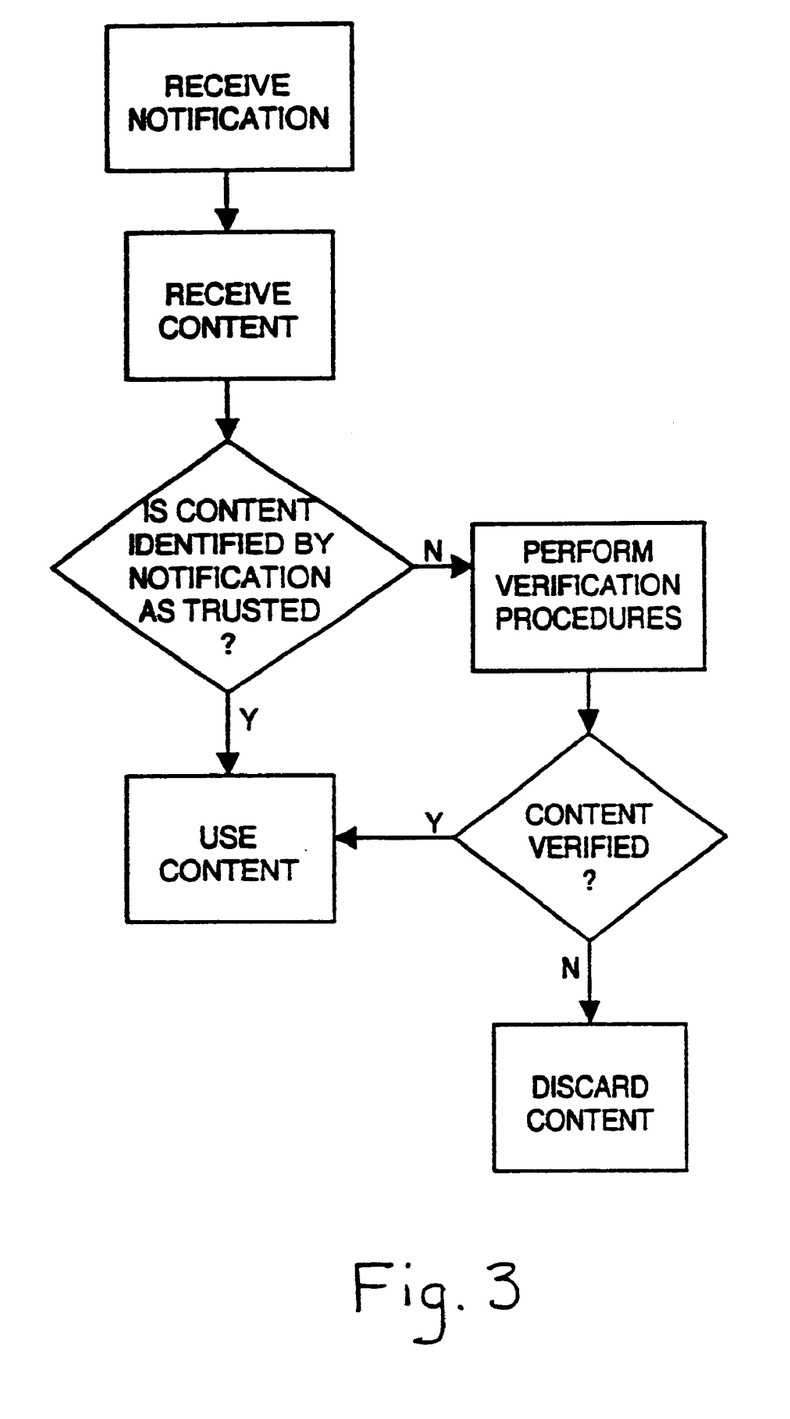
FIG. 3 is a flow diagram illustrating the method by which the receiver operates in one embodiment.

Referring to FIG. 3, a flow diagram illustrating the method employed by the receiver is shown. In this method, a notification is provided to the receiver to identify content which can be trusted and therefore requires no verification by the receiver. When content is received by the receiver, the receiver determines whether the content is trusted, based upon the notification. If the content is trusted, it is then used by the receiver with no further verification. If the content is not trusted, the receiver performs the normal verification procedures on the content. If the content can be verified using these procedures, the content is then used by the receiver. If the content cannot be verified using the normal verification procedures, it is discarded (i.e., not used.)

The notification can be delivered with the trusted content, or it can be delivered prior to transmission of the trusted content. The particular manner in which the notification is delivered may vary from one embodiment to another. For example, in one embodiment, the notification may be delivered to the receiver via a secure channel (e.g., a conditional access EMM, or a direct point-to-point connection between the sender and the receiver.) Because the channel is secure, there is no need to encrypt the notification or provide a credential to be used in verifying the notification. In another embodiment, the notification may be delivered via a channel which is not secure. In this case, the notification may be signed or it may provide other means to verify its authenticity. In yet another embodiment, the notification may be included in signed data within an application or module, so that when the application or module is verified, the notification is also verified. The notification may then indicate that subsequent content is to be trusted. It is contemplated that multiple notifications may be actively used by the receiver to determine whether or not received content is trusted.

Figure 4:
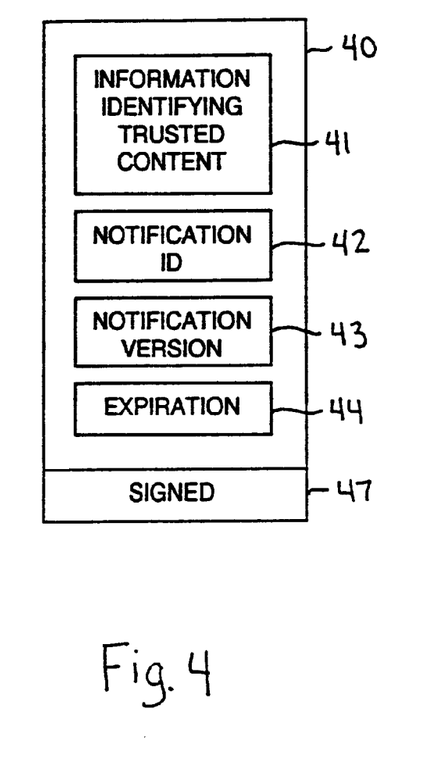
FIG. 4 is a diagram illustrating the data components of a notification in one embodiment.

Referring to FIG. 4, a diagram illustrating the data components of a notification in one embodiment is shown. The primary component of notification 40 is the information 41 identifying which content is to be trusted. The trusted content may be identified in a number of different ways. For example, the content may be identified by its source or by reference to the content itself. The source of the content may be a service provider, a program, a channel, a bouquet (a collection of channels,) or a network (a collection of bouquets.) If the content is identified by its source, all of the content received from the trusted source is trusted by the receiver until the notification expires, or is superseded or revoked. The trusted content may also be identified by reference to the particular content which is trusted, regardless of its source. In this case, the notification may identify particular applications, portions of applications, modules, programs, data streams or other content. Whether the trusted content is identified by source or by reference to particular content, wildcards may be used in the identification. For example, all applications from a particular producer which have an ID beginning with a particular number may be trusted.

The identification of the trusted content may be either positive or negative. That is, a notification may identify content which is to be trusted, or it may identify content which is not to be trusted. By explicitly identifying the content which is not trusted, the remaining content can be identified as being trusted. In either case, the trusted content is identified by the notification. Similarly, the receiver may use either a positive or negative default for verification procedures. In other words, the receiver may be configured to verify all received content unless some content is identified as not requiring verification (i.e., the content is trusted), or it may be configured not to verify any received content unless some content is identified as requiring verification (i.e., the content is not trusted).

As can be seen from FIG. 4, the notification may also include various components in addition to the information identifying the trusted content. In this embodiment, the notification also includes a notification ID 42, a notification version 43 and an expiration 44. Further, notification 40 includes a signature 47 for the purpose of verifying the notification.

Expiration 44, notification ID 42 and notification version 43 are used to limit the lifetime of the notification. Expiration 44 gives a date and/or time at which the notification expires. The notification's identification of trusted content is valid only until the expiration time. In a system which by default verifies all content, content which is identified by the notification as being trusted is not verified if received before the expiration time, but is verified if received after the expiration time. Although not depicted in the figure, is contemplated that the notification may also include a start time at which the notification initially becomes valid. Notification ID 42 and notification version 43 may also limit the lifetime of a particular notification. A subsequent notification which has a notification ID identical to a prior notification will supersede the prior notification if the subsequent notification has a later version number. In this case, the first notification does not necessarily become invalid in its entirety, but instead is replaced by the second, superseding notification. If no subsequent notification is received, the prior notification will remain valid indefinitely (unless it expires or is otherwise terminated). The subsequent notification may modify only parts of the prior notification while maintaining the remainder, or it may provide an entirely different identification of the content to be trusted.

Notification 40 incorporates signature 47 to enable verification of the notification's authenticity. A signature utilizes means such as public key encryption to enable verification of associated content. Public key encryption systems may employ various encryption algorithms. Whichever algorithm is selected for a particular public key encryption system, the system utilizes a pair of encryption keys, one of which is termed a private key and one of which is called a public key. The private key is kept secret by its owner, while the public key is made freely available. A message or other file which is encrypted with the public key can only be decrypted with the private key. Likewise, a file which is encrypted with the private key can only be decrypted with the public key. When a message is encrypted with one of the keys, it is converted into an apparently random set of characters. Thus, when a message encrypted with a public key is sent to the holder of the private key, the sender can be assured that, even if the message is intercepted, only the intended recipient (who holds the private key) can decrypt it and read the message. When a message is signed, rather than encrypted, the message remains in readable form, but an encrypted signature is appended to the message. While anyone who sees the message can read it, the signature can be used to verify that the message originated with the holder of the private key. Further, because the algorithm that encrypts the signature is dependent in part upon the message which precedes the signature, any changes to the message will cause the signature to be unverifiable. The signature can therefore be used to ensure that the message is unaltered.

Figure 5:
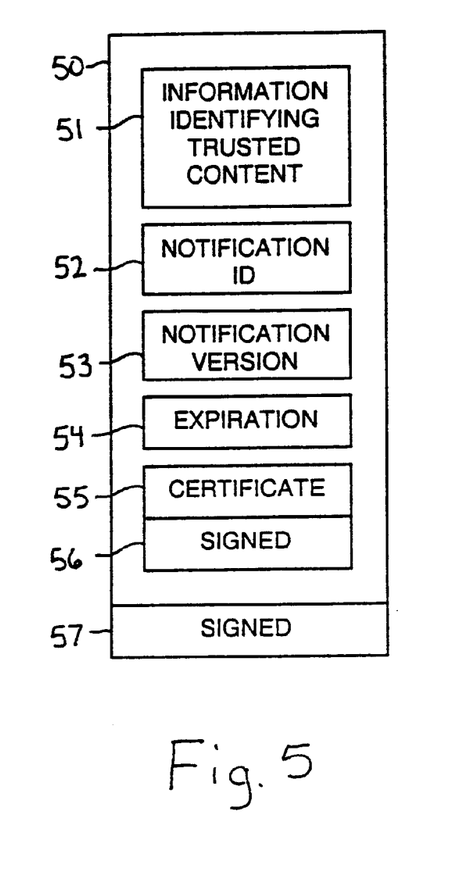
FIG. 5 is a diagram illustrating the data components of a notification in an alternate embodiment.

Referring to FIG. 5, a notification in an alternate embodiment is illustrated. Notification 50 includes information 51, a notification ID 52, a notification version 53, an expiration 54, and a certificate 55. Notification 50 includes the signature 56 of the notification's originator and certificate 55 includes the signature 57 of a trusted party. Certificate 55 is used as a means to guarantee that notification 50 was created by an authorized party. Certificate 55 is the public key of the notification's originator, signed by some trusted party. A trusted party is one who can vouch for the authenticity of the key. The trusted party's signature is encrypted and incorporated into the key. The trusted party's public key is well known. That is, it is stored in the receiver and is always available to the receiver. The entire notification 50 is then signed 57 with the authorized party's private key to ensure that none of the data in the notification 50 can be modified. The use of certificate 55 in notification 50 provides a means to verify that information 51 is authorized. Notification 50 is therefore suitable to allow the notification to identify trusted content produced by a third party rather than a trusted party.

It should be noted that the certificates and signatures used in the notifications described above are intended to ensure the authenticity of the notifications. In some embodiments, notifications may be delivered to the receiver by a secure delivery means, in which case the signatures and/or certificates may not be necessary.

As noted above, verification of interactive television content may include many different types of procedures. For example, verification may include authentication of the content. The interactive television content may comprise various types of data, such as streams of audio and/or video data, or modules of application data, each of which can be accompanied by some sort of signature which can be used to verify the data. The interactive television content may also include some type of credential. In typical prior art systems, if interactive television content is transmitted with a signature or credential, the receiver may automatically verify the signature or credential upon receipt or use of the content. As explained above, this may entail using public key encryption algorithms to verify the signature or to perform processes related to the credential (e.g., modifying an application's access rights.) Consequently, a portion of the receiver's processing power may be consumed by the verification and other processes, regardless of whether the content was delivered via a secure medium. The present system and method can therefore be employed to identify the received content as trusted or not-trusted and, if it can be trusted, to inhibit processes which would otherwise be carried out. As a result, the receiver's processing power is not wasted on unnecessary procedures.

Another type of operation which, in the case of trusted content, can be avoided in the present system is code verification. Code verification is related to the quality of the content rather than the security of the content. Code verification is generally intended to ensure that the binary representation of code such as a class or interface is structurally correct. For example, code verification procedures may include checking each instruction to be sure it has a valid operation code or checking each branch instruction to be sure it branches to the beginning to instruction rather than the middle of an instruction. Code verification is often performed on Java applets or applications prior to executing them so that there is no need to make these structural checks during execution of the applets or application. Code verification which is performed prior to runtime allows the verified code to execute more quickly. Although code verification can increase the execution speed of an applet or application, the structural checks performed in the verification are not eliminated—they are simply performed prior to run time instead of during runtime. The receiver still has to devote valuable, limited resources to the verification. The present system allows the verification procedures to be moved entirely out of the receiver. That is, if the application code (interactive television content) has been verified prior to its delivery to the receiver, and there is some assurance that the verification of the delivered code is still valid (i.e., the code is trusted,) there is no need to verify it again at the receiver. Inhibiting code verification therefore prevents the waste of the receiver's processing resources on this unnecessary verification. (It should be noted that the present system can be used to avoid unnecessary code verification, whether the verification occurs prior to runtime or at runtime.)

The examples above are intended to illustrate some of the procedures which can be avoided by various embodiments of the present system. Reference to these procedures as verification procedures is not intended to limit the types of procedures which may be involved, but simply to provide a convenient label for procedures that can be avoided using the present system. Thus, there may be many other types of procedures which are not necessary, but which are performed on interactive television content by default. If it can be determined prior to transmitting particular content that it is unnecessary to perform these procedures, that content can be considered trusted and the interactive television receiver can be configured to inhibit the procedures as to the trusted content. Consequently, the present system may be used to avoid the a wide range of procedures which may not need to be performed, thereby improving the efficiency of the interactive television systems in which it is incorporated.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A method of performing verification procedures on a selective basis, said method comprising:
   receiving interactive television content in an interactive television receiver, wherein said interactive television content comprises a first portion which is trusted and a second portion which is not trusted;
   receiving a notification in said interactive television receiver, wherein said notification identifies said first portion of said interactive television content as being trusted content;
   said receiver performing one or more verification procedures relating to said second portion of said interactive television content; and
   said receiver inhibiting performance of said one or more verification procedures in relation to said first portion of said interactive television content in response to detecting said notification;
   wherein said notification includes a certificate associated with said first portion of said interactive television content.

2. The method of claim 1 wherein said first portion of said interactive television content is identified by one or more wildcards.

3. The method of claim 1 wherein said notification has an expiration time associated therewith, wherein said notification is valid before said expiration date and invalid after said expiration time.

4. The method of claim 1 wherein said notification has a version number associated therewith, wherein a notification having a later version number supersedes a notification having an earlier version number.

5. A method of performing verification procedures on a selective basis, said method comprising:
   receiving interactive television content in an interactive television receiver, wherein said interactive television content comprises a first portion which is trusted and a second portion which is not trusted;
   receiving a notification in said interactive television receiver, wherein said notification identifies said first portion of said interactive television content as being trusted content;
   said receiver performing one or more verification procedures relating to said second portion of said interactive television content; and
   said receiver inhibiting performance of said one or more verification procedures in relation to said first portion of said interactive television content in response to detecting said notification;
   wherein said first portion of said interactive television content is identified by explicitly identifying said second portion of said interactive television content.

6. The method of claim 5 wherein said first portion of said interactive television content is identified by one or more wildcards.

7. The method of claim 5 wherein said notification has an expiration time associated therewith, wherein said notification is valid before said expiration date and invalid after said expiration time.

8. The method of claim 5 wherein said notification has a version number associated therewith, wherein a notification having a later version number supersedes a notification having an earlier version number.

9. A method of performing verification procedures on a selective basis, said method comprising:
   receiving interactive television content in an interactive television receiver, wherein said interactive television content comprises a first portion which is trusted and a second portion which is not trusted;
   receiving a notification in said interactive television receiver, wherein said notification identifies said first portion of said interactive television content as being trusted content;
   said receiver performing one or more verification procedures relating to said second portion of said interactive television content; and said receiver inhibiting performance of said one or more verification procedures in relation to said first portion of said interactive television content in response to detecting said notification;

wherein said notification is contained in a credential, wherein said credential is signed by a producer of said credential, and wherein said credential contains a certificate for verifying said producer's signature and granting said producer a right to provide trusted content.

10. The method of claim 9 wherein said first portion of said interactive television content is identified by one or more wildcards.

11. The method of claim 9 wherein said notification has an expiration time associated therewith, wherein said notification is valid before said expiration date and invalid after said expiration time.

12. The method of claim 9 wherein said notification has a version number associated therewith, wherein a notification having a later version number supersedes a notification having an earlier version number.

13. A method of performing verification procedures on a selective basis, said method comprising:

receiving interactive television content in an interactive television receiver, wherein said interactive television content comprises a first portion which is trusted and a second portion which is not trusted;

receiving a notification in said interactive television receiver, wherein said notification identifies said first portion of said interactive television content as being trusted content;

said receiver performing one or more verification procedures relating to said second portion of said interactive television content; and said receiver inhibiting performance of said one or more verification procedures in relation to said first portion of said interactive television content in response to detecting said notification;

wherein said one or more verification procedures comprise one or more of:
authenticating said interactive television content;
verifying that said interactive television content has not been tampered with during transmission;
verifying that said interactive television content has appropriate access rights; and
verifying that said interactive television content complies with a predetermined specification.

14. The method of claim 13 further comprising transmitting said interactive television content to said interactive television receiver and transmitting said notification to said interactive television receiver.

15. The method of claim 13 wherein said first portion of said interactive television content comprises content associated with an identified source.

16. The method of claim 15 wherein said source is selected from the group consisting of: a bouquet; a network; a channel; and a program.

17. The method of claim 15 wherein said source comprises a service provider.

18. The method of claim 13 wherein said first portion of said interactive television content comprises identified pieces of content.

19. The method of claim 18 wherein said pieces of content comprise at least a portion of an interactive television application.

20. The method of claim 18 wherein said first portion of said interactive television content is identified by one or more wildcards.

21. The method of claim 13 wherein said first portion of said interactive television content is identified by explicitly identifying said second portion of said interactive television content.

22. The method of claim 13 wherein said notification is transmitted to said receiver prior to transmitting said interactive television content to said receiver.

23. The method of claim 13 wherein said notification is transmitted to said receiver with said interactive television content.

24. The method of claim 13 wherein said notification is delivered via a trusted delivery channel.

25. The method of claim 24 wherein said trusted delivery channel comprises a conditional access EMM.

26. The method of claim 24 wherein said trusted delivery channel comprises a point-to-point channel.

27. The method of claim 26 wherein said notification is pushed to said receiver on said point-to-point channel.

28. The method of claim 26 wherein said notification is pulled by said receiver on said point-to-point channel.

29. The method of claim 13 wherein said notification is contained in signed data associated with an application.

30. The method of claim 13 wherein said notification has an expiration time associated therewith, wherein said notification is valid before said expiration date and invalid after said expiration time.

31. The method of claim 13 wherein said notification has a version number associated therewith, wherein a notification having a later version number supersedes a notification having an earlier version number.

32. A system configured to perform verification procedures on a selective basis, said system comprising:

an interactive television receiver having one or more signal receivers configured to:
receive interactive television content, said content comprising a first portion which is trusted and a second portion which is not trusted; and
a notification which identifies said first portion of said interactive television content as trusted data;

a memory, wherein said memory is configured to store said notification; and a data verification unit coupled to said signal receivers and said memory;

wherein said data verification unit is configured to:
identify said first portion of said interactive television content as being trusted based on said notification;
perform one or more verification procedures relating to said second portion of said interactive television content; and
inhibit performance of one or more verification procedures in relation to said first portion of said interactive television content responsive to detecting said notification;

wherein said one or more verification procedures comprise one or more of:
authenticating said interactive television content;
verifying that said interactive television content has not been tampered with during transmission;
verifying that said interactive television content has appropriate access rights; and
verifying that said interactive television content complies with a predetermined specification.

33. The system of claim 32 wherein said notification comprises a first version of said notification, and wherein when said data verification unit receives a second version of said notification, said data verification unit is configured to replace said first version of said notification in said memory with said second version of said notification to identify said first portion of said interactive television content based on said second version of said notification.

34. A system configured to perform verification procedures on a selective basis, said system comprising:
   an interactive television receiver having one or more signal receivers configured to:
      receive interactive television content, said content comprising a first portion which is trusted and a second portion which is not trusted; and
      a notification which identifies said first portion of said interactive television content as trusted data;
   a memory, wherein said memory is configured to store said notification; and
   a data verification unit coupled to said signal receivers and said memory;
   wherein said data verification unit is configured to:
      identify said first portion of said interactive television content as being trusted based on said notification;
      perform one or more verification procedures relating to said second portion of said interactive television content; and
      inhibit performance of one or more verification procedures in relation to said first portion of said interactive television content responsive to detecting said notification;
   wherein said first portion of said interactive television content is identified by explicitly identifying said second portion of said interactive television content.

35. The system of claim 34 wherein said notification comprises a first version of said notification, and wherein when said data verification unit receives a second version of said notification, said data verification unit is configured to replace said first version of said notification in said memory with said second version of said notification to identify said first portion of said interactive television content based on said second version of said notification.

36. A system configured to perform verification procedures on a selective basis, said system comprising:
   an interactive television receiver having one or more signal receivers configured to:
      receive interactive television content, said content comprising a first portion which is trusted and a second portion which is not trusted; and
      a notification which identifies said first portion of said interactive television content as trusted data;
   a memory, wherein said memory is configured to store said notification; and
   a data verification unit coupled to said signal receivers and said memory;
   wherein said data verification unit is configured to:
      identify said first portion of said interactive television content as being trusted based on said notification;
      perform one or more verification procedures relating to said second portion of said interactive television content; and
      inhibit performance of one or more verification procedures in relation to said first portion of said interactive television content responsive to detecting said notification;
   wherein said notification is contained in a credential, wherein said credential is signed by a producer of said credential, and wherein said credential contains a certificate for verifying said producer's signature and granting said producer a right to provide trusted content.

37. The system of claim 36 wherein said notification comprises a first version of said notification, and wherein when said data verification unit receives a second version of said notification, said data verification unit is configured to replace said first version of said notification in said memory with said second version of said notification to identify said first portion of said interactive television content based on said second version of said notification.

38. A system configured to perform verification procedures on a selective basis, said system comprising:
   an interactive television receiver having one or more signal receivers configured to:
      receive interactive television content, said content comprising a first portion which is trusted and a second portion which is not trusted; and
      a notification which identifies said first portion of said interactive television content as trusted data;
   a memory, wherein said memory is configured to store said notification; and
   a data verification unit coupled to said signal receivers and said memory;
   wherein said data verification unit is configured to:
      identify said first portion of said interactive television content as being trusted based on said notification;
      perform one or more verification procedures relating to said second portion of said interactive television content; and
      inhibit performance of one or more verification procedures in relation to said first portion of said interactive television content responsive to detecting said notification;
   wherein said notification includes a certificate associated with said first portion of said interactive television content.

39. The system of claim 38 wherein said interactive television content is delivered to a first one of said one or more signal receivers by a first medium and said notification is delivered to a second one of said one or more signal receivers by a second medium.

40. The system of claim 38 wherein said notification comprises a first version of said notification, and wherein when said data verification unit receives a second version of said notification, said data verification unit is configured to replace said first version of said notification in said memory with said second version of said notification to identify said first portion of said interactive television content based on said second version of said notification.

41. The system of claim 38 further comprising an interactive television transmitter and a transmission medium, wherein said interactive television transmitter is coupled to said interactive television receiver by said transmission medium and wherein said interactive television transmitter is configured to transmit said interactive television data to said interactive television receiver via said transmission medium.

42. The system of claim 38 further comprising a notification source coupled to said interactive television receiver, wherein said notification source is configured to transmit said notification to said interactive television receiver.

43. The system of claim 38 wherein said notification comprises data signed by a trusted party.

44. The system of claim 38 wherein said notification is contained in a credential, wherein said credential is signed by a producer of said credential, and wherein said credential contains a certificate for verifying said producer's signature and granting said producer a right to provide trusted content.

* * * * *